United States Patent
Rackleff et al.

(10) Patent No.: US 10,046,784 B2
(45) Date of Patent: Aug. 14, 2018

(54) TRAILER HITCH ATTACHABLE INSULATED COOLERS AND METHODS OF MAKING AND USING THE SAME

(71) Applicant: BIG KAT BUGGY, LLC, Statesboro, GA (US)

(72) Inventors: Richard Kevin Rackleff, Statesboro, GA (US); Roy Elmer Blackburn, Metter, GA (US)

(73) Assignee: BIG KAT BUGGY, LLC, Statesboro, GA (US)

(*) Notice: Subject to any disclaimer, the term of this patent is extended or adjusted under 35 U.S.C. 154(b) by 6 days.

(21) Appl. No.: 15/403,772

(22) Filed: Jan. 11, 2017

(65) Prior Publication Data

US 2017/0197648 A1    Jul. 13, 2017

Related U.S. Application Data

(60) Provisional application No. 62/276,994, filed on Jan. 11, 2016.

(51) Int. Cl.

| B62B 5/00 | (2006.01) |
| B62B 5/06 | (2006.01) |
| A01K 97/22 | (2006.01) |
| B60D 1/58 | (2006.01) |
| B62B 3/00 | (2006.01) |

(52) U.S. Cl.
CPC .............. B62B 5/067 (2013.01); A01K 97/22 (2013.01); B60D 1/58 (2013.01); B62B 3/001 (2013.01); B62B 3/007 (2013.01); B62B 5/0003 (2013.01); B62B 2204/06 (2013.01)

(58) Field of Classification Search
None
See application file for complete search history.

(56) References Cited

U.S. PATENT DOCUMENTS

| 7,384,051 | B1* | 6/2008 | Haire | A01K 97/05 |
| | | | | 280/47.34 |
| 7,641,235 | B1* | 1/2010 | Anduss | B60R 9/06 |
| | | | | 224/509 |
| 2004/0173654 | A1* | 9/2004 | McAlister | B60D 1/52 |
| | | | | 224/519 |
| 2009/0146394 | A1 | 6/2009 | Seivert | |
| 2009/0152314 | A1* | 6/2009 | Myrex | B60R 9/06 |
| | | | | 224/502 |
| 2014/0054299 | A1* | 2/2014 | Kamin | F25D 23/00 |
| | | | | 220/592.2 |

OTHER PUBLICATIONS

PCT Application No. PCT/US2017/012999 International Search Report and Written Opinion, dated Mar. 28, 2017.

* cited by examiner

*Primary Examiner* — James A Shriver, II
*Assistant Examiner* — Hilary L Johns
(74) *Attorney, Agent, or Firm* — Withers & Keys, LLC

(57) ABSTRACT

Trailer hitch attachable coolers are disclosed. Methods of making trailer hitch attachable coolers, and methods of using trailer hitch attachable coolers are also disclosed.

1 Claim, 13 Drawing Sheets

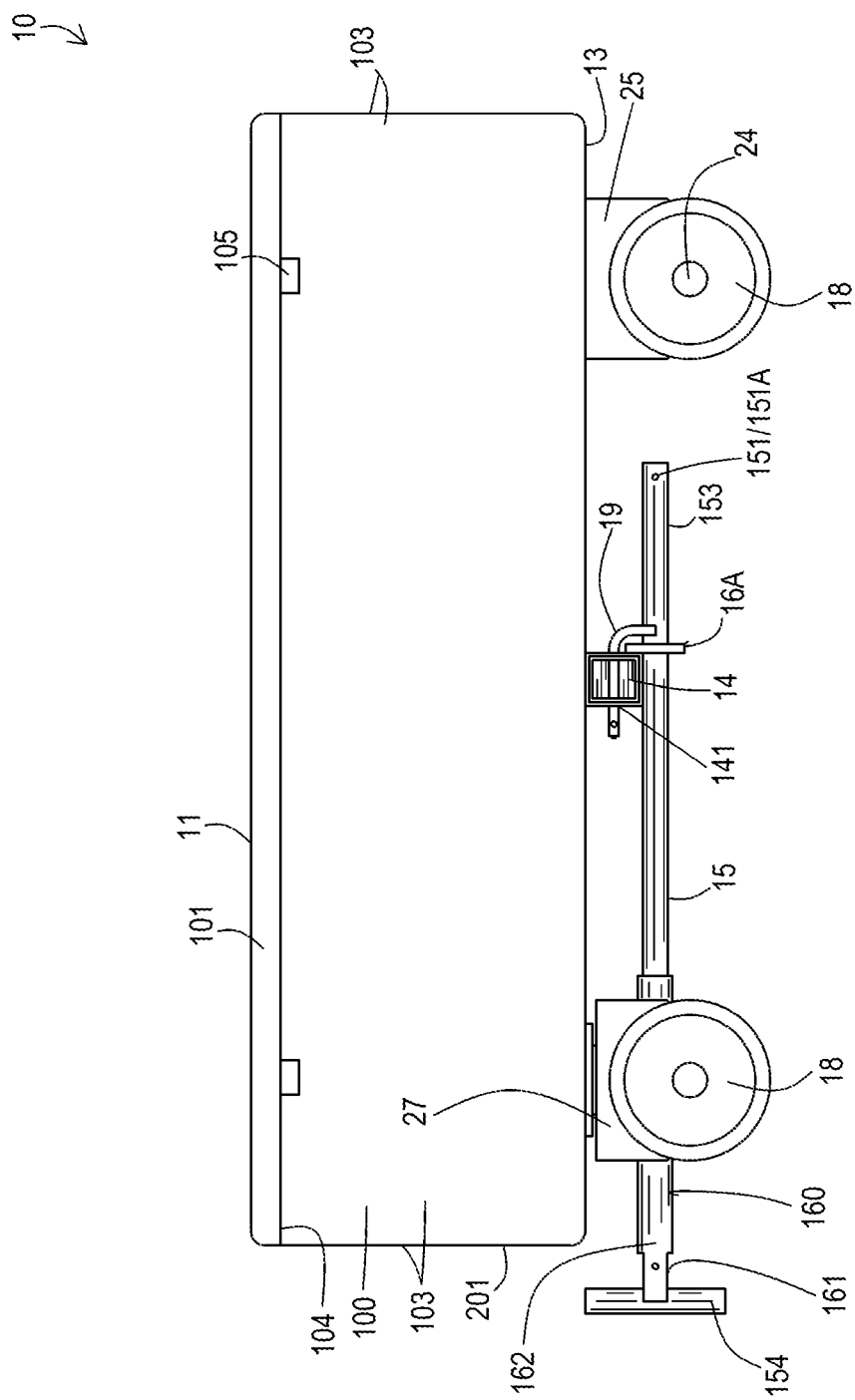

TRAILER HITCH ATTACHABLE INSULATED COOLERS AND METHODS OF MAKING AND USING THE SAME

CROSS-REFERENCE TO RELATED APPLICATIONS

This patent application claims the benefit of priority to U.S. Provisional Patent Application Ser. No. 62/276,994 filed on 11 Jan. 2016 and entitled "TRAILER HITCH ATTACHABLE INSULATED COOLERS AND METHODS OF MAKING AND USING THE SAME", the subject matter of which is hereby incorporated by reference in its entirety.

FIELD OF THE INVENTION

The present invention relates to trailer hitch attachable coolers. The present invention also relates to methods of making trailer hitch attachable coolers and methods of using trailer hitch attachable coolers.

BACKGROUND OF THE INVENTION

Efforts continue to provide innovative and useful trailer hitch attachable coolers.

SUMMARY OF THE INVENTION

The present invention provides new trailer hitch attachable coolers. The trailer hitch attachable coolers of the present invention provide one or more of the following benefits: (1) ease to produce; (2) ease of use; (3) exceptional design; and (4) ergonomic design.

Accordingly, in one exemplary embodiment, the present invention is directed to trailer hitch attachable coolers. In some exemplary embodiments of the present invention, the trailer hitch attachable cart comprises: a cooler body 100; and a first tubular member 14 (i) integrally attached to said cooler body 100 and (ii) having a first size and a first cross-sectional shape so as to enable attachment of said cooler 10 to a trailer hitch receiving member 301 of a vehicle 300.

In some exemplary embodiments of the present invention, the trailer hitch attachable cart comprises: a cooler body, a cooler lid, a cooler volume bound by said cooler body and said cooler lid, a cooler upper surface, a cooler lower surface opposite said cooler upper surface, one or more cooler side walls extending between said cooler lower surface and a cooler body upper edge, a cooler length L, and a cooler width W; and a first tubular member (i) integrally attached to said lower cooler surface or embedded within said one or more cooler side walls, (ii) extending along said cooler width W a distance of at least 0.5 W, and (iii) having a first size and a first cross-sectional shape so as to enable attachment of said cooler to a trailer hitch receiving member.

In some exemplary embodiments of the present invention, the trailer hitch attachable cart comprises: a cooler body, a cooler lid, a cooler volume bound by said cooler body and said cooler lid, a cooler upper surface, a cooler lower surface opposite said cooler upper surface, one or more cooler side walls extending between said cooler lower surface and a cooler body upper edge, a cooler length L, and a cooler width W; a first tubular member (i) integrally attached to said lower cooler surface or embedded within said one or more cooler side walls, (ii) extending along said cooler width W a distance of at least 0.5 W, and (iii) having a first size and a first cross-sectional shape so as to enable attachment of said cooler to a trailer hitch receiving member; and two or more wheels (i) permanently attached to said lower cooler surface of said cooler and (ii) extending below said first tubular member.

As discussed further below, any of the herein-disclosed trailer hitch attachable coolers may comprise a variety of components so as to provide a trailer hitch attachable cooler having a desired set of features.

The present invention is even further directed to methods of making trailer hitch attachable coolers. In some exemplary embodiments of the present invention, the method of making a trailer hitch attachable cooler comprises: assembling cooler components so as to form a cooler, the cooler comprising: a cooler body 100; and a first tubular member 14 (i) integrally attached to the cooler body 100 and (ii) having a first size and a first cross-sectional shape so as to enable attachment of the cooler 10 to a trailer hitch receiving member 301 of a vehicle 300.

In some exemplary embodiments of the present invention, the method of making a trailer hitch attachable cooler comprises: assembling cooler components so as to form a cooler, the cooler comprising: a cooler body, a cooler lid, a cooler volume bound by said cooler body and said cooler lid, a cooler upper surface, a cooler lower surface opposite said cooler upper surface, one or more cooler side walls extending between said cooler lower surface and a cooler body upper edge, a cooler length L, and a cooler width W; and a first tubular member (i) integrally attached to said lower cooler surface or embedded within said one or more cooler side walls, (ii) extending along said cooler width W a distance of at least 0.5 W, and (iii) having a first size and a first cross-sectional shape so as to enable attachment of said cooler to a trailer hitch receiving member.

In some exemplary embodiments of the present invention, the method of making a trailer hitch attachable cooler comprises: assembling cooler components so as to form a cooler, the cooler comprising: a cooler body, a cooler lid, a cooler volume bound by said cooler body and said cooler lid, a cooler upper surface, a cooler lower surface opposite said cooler upper surface, one or more cooler side walls extending between said cooler lower surface and a cooler body upper edge, a cooler length L, and a cooler width W; a first tubular member (i) integrally attached to said lower cooler surface or embedded within said one or more cooler side walls, (ii) extending along said cooler width W a distance of at least 0.5 W, and (iii) having a first size and a first cross-sectional shape so as to enable attachment of said cooler to a trailer hitch receiving member; and two or more wheels (i) permanently attached to said lower cooler surface of said cooler and (ii) extending below said first tubular member.

The present invention is even further directed to a method of using trailer hitch attachable coolers. In one exemplary embodiment, the method of using a trailer hitch attachable cooler comprises: attaching any one of the herein-described trailer hitch attachable coolers to a trailer hitch receiving member of a vehicle. Methods of using a trailer hitch attachable cooler of the present invention may further comprise one of more additional steps including, but not limited to, storing one or more items within the cooler volume of the cooler; detaching the trailer hitch attachable cooler from the trailer hitch receiving member of the vehicle; detaching the rotatable cooler handle from the trailer hitch attachable cooler; storing the rotatable cooler handle underneath the cooler via the one or more cooler handle seating members; removing the rotatable cooler handle from the one or more cooler handle seating members underneath the cooler; attaching the rotatable cooler handle to the trailer hitch attachable cooler; and moving the trailer hitch attachable cooler from one location to another location by applying a pulling force on the rotatable cooler handle. The methods of using any of the herein-described trailer hitch attachable coolers may be practiced using vehicles such as a car, a truck, an all-terrain vehicle, or a bus.

These and other features and advantages of the present invention will become apparent after a review of the following detailed description of the disclosed embodiments and the appended claims.

BRIEF DESCRIPTION OF THE FIGURES

FIG. 5 is a rear view of the exemplary trailer hitch attachable cooler of FIG. 1;

DETAILED DESCRIPTION OF THE INVENTION

Figure 1:
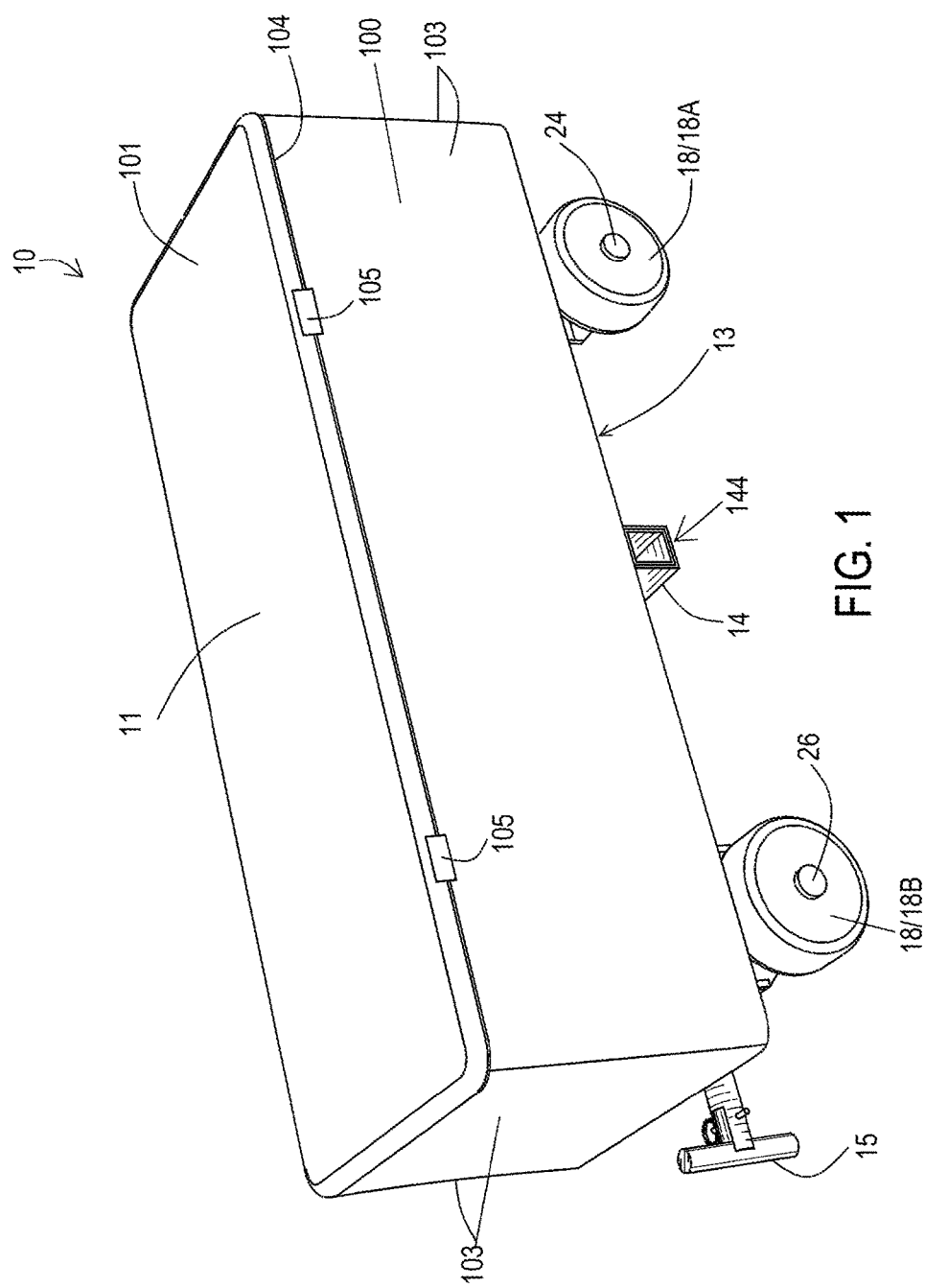
FIG. 1 is a perspective view of an exemplary trailer hitch attachable cooler of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to trailer hitch attachable coolers. The present invention is further directed to methods of making trailer hitch attachable coolers. The present invention is even further directed to methods of using trailer hitch attachable coolers.

The trailer hitch attachable coolers of the present invention and methods of making and using trailer hitch attachable coolers of the present invention are further described in the embodiments below.

Trailer Hitch Attachable Cooler Embodiments

1. A trailer hitch attachable cooler 10, said cooler 10 comprising: a cooler body 100; and a first tubular member 14 (i) integrally attached to said cooler body 100 and (ii) having a first size and a first cross-sectional shape so as to enable attachment of said cooler 10 to a trailer hitch receiving member 301 of a vehicle 300. The first cross-sectional shape is typically a square shape (e.g., a square shape with rounded corners), but may be any desired cross-sectional shape (e.g., rectangular, triangular, hexagon, star, oblong, etc. shapes).

2. The trailer hitch attachable cooler 10 of embodiment 1, wherein said cooler 10 further comprises: a cooler lid 101, a cooler volume 102 bound by said cooler body 100 and said cooler lid 101, a cooler upper surface 11, a cooler lower surface 13 opposite said cooler upper surface 11, one or more cooler side walls 103 extending between said cooler lower surface 13 and a cooler body upper edge 104, a cooler length L, and a cooler width W.

3. The trailer hitch attachable cooler 10 of embodiment 1 or 2, wherein said first tubular member 14 (i) is integrally attached to a lower cooler surface 13 or embedded within one or more cooler side walls 103, and (ii) extends along a cooler width W a distance of at least 0.5 W.

4. The trailer hitch attachable cooler 10 of any one of embodiments 1 to 3, wherein said cooler 10 further comprises: two or more wheels 18 (i) permanently attached to a lower cooler surface 13 of said cooler 10 and (ii) extending below said first tubular member 14. As used herein, the phrase "permanently attached" describes wheels 18 that are attached in a fixed position to said lower major surface 13 of said cooler 10, and not meant to be removed unless replaced due to wear. Typically, each wheel 18 has a similar wheel size and shape. In some embodiments, each wheel 18 has an overall diameter of from about 3.0 inches (in.) to about 12.0 in. (or any value between 3.0 in. and 12.0 in., in increments of 0.1 in., e.g., 8.5 in., or any range of values between 3.0 in. and 12.0 in, in increments of 0.1 in., e.g., 3.4 in. to 9.8 in.), and a wheel width of from about 2.0 in. to about 7.5 in. (or any value between 2.0 in. and 7.5 in., in increments of 0.1 in., e.g., 5.0 in., or any range of values between 2.0 in. and 7.5 in., in increments of 0.1 in., e.g., 3.8 in. to 5.8 in.). In one desired embodiment, each wheel 18 has an overall diameter of about 8.5 in. and a wheel width of about 5.0 in. As used herein, the phrase "extending below said first tubular member 14" describes wheels that are of sufficient size so as to position first tubular member 14 above a flat surface on which the wheels 18 are positioned. In addition, each wheel 18 is of a size such that when trailer hitch attachable cooler 10 of the present invention is attached to a trailer hitch receiving member 301 of a vehicle 300 (e.g., a car, truck, van, bus, etc.), each wheel 18 is positioned above and does not come into contact with the ground on which the vehicle 300 rests.

5. The trailer hitch attachable cooler 10 of any one of embodiments 1 to 4, wherein said cooler 10 further comprises: three or more wheels 18 (i) permanently attached to a lower cooler surface 13 of said cooler 10 and (ii) extending below said first tubular member 14.

6. The trailer hitch attachable cooler 10 of any one of embodiments 1 to 5, wherein said first tubular member 14 extends along said cooler width W a distance substantially equal to W.

7. The trailer hitch attachable cooler 10 of any one of embodiments 1 to 6, further comprising: a second tubular member 17 having a second size and a second cross-sectional shape so as to be snugly positioned within said first tubular member 14, said second tubular member 17 having a first engagement end 17A sized to be snugly positioned within said first tubular member 14, and a second engagement end 17B, opposite said first engagement end 17B, sized to be snugly positioned within a trailer hitch receiving member 301.

8. The trailer hitch attachable cooler 10 of embodiment 7, wherein said second tubular member 17 extends along said cooler width W a distance substantially equal to W.

Figure 2:
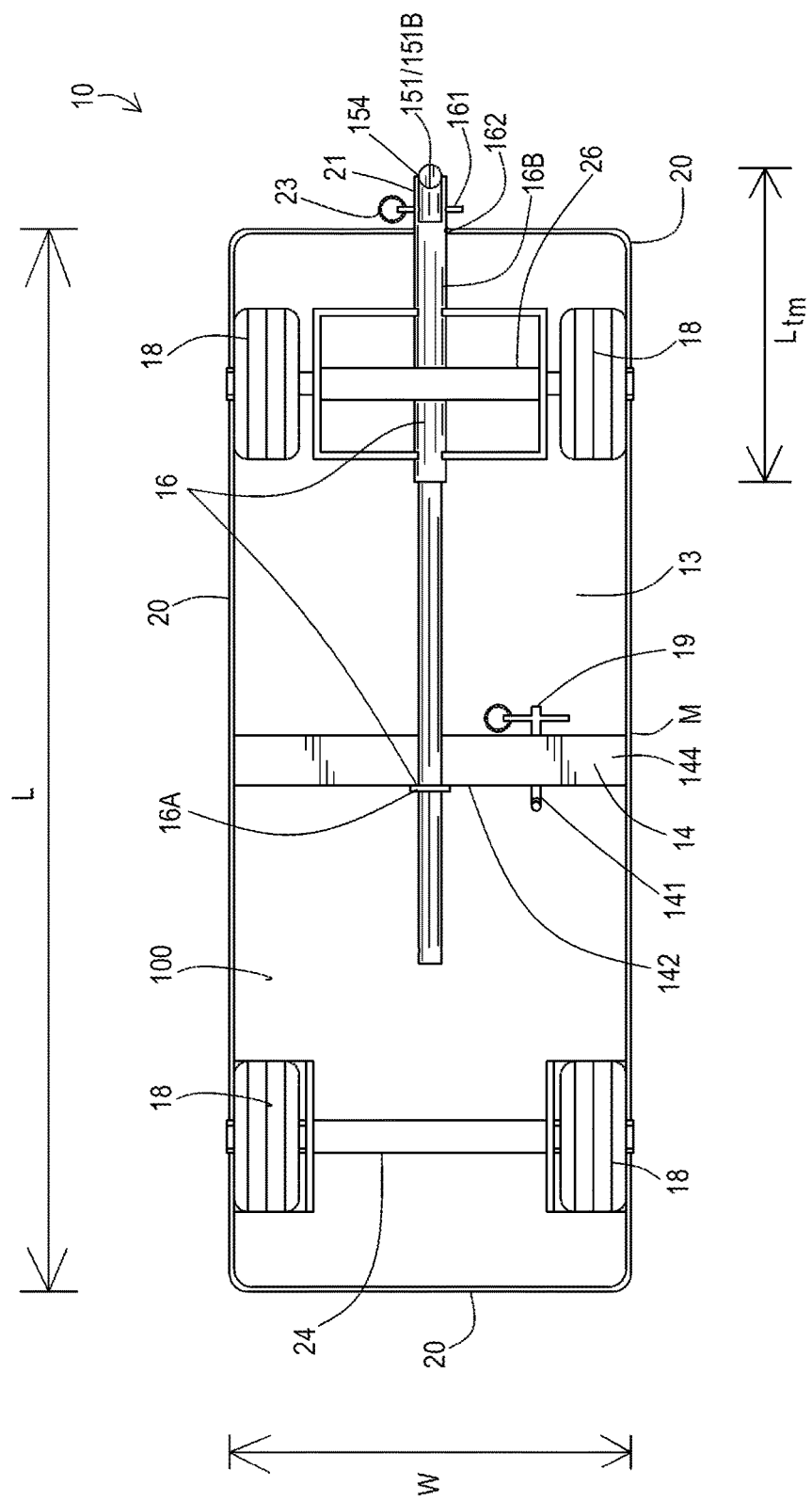
FIG. 2 is a bottom view of the exemplary trailer hitch attachable cooler of FIG. 1 showing a rotatable cooler handle in a storage position.
Figure 8:
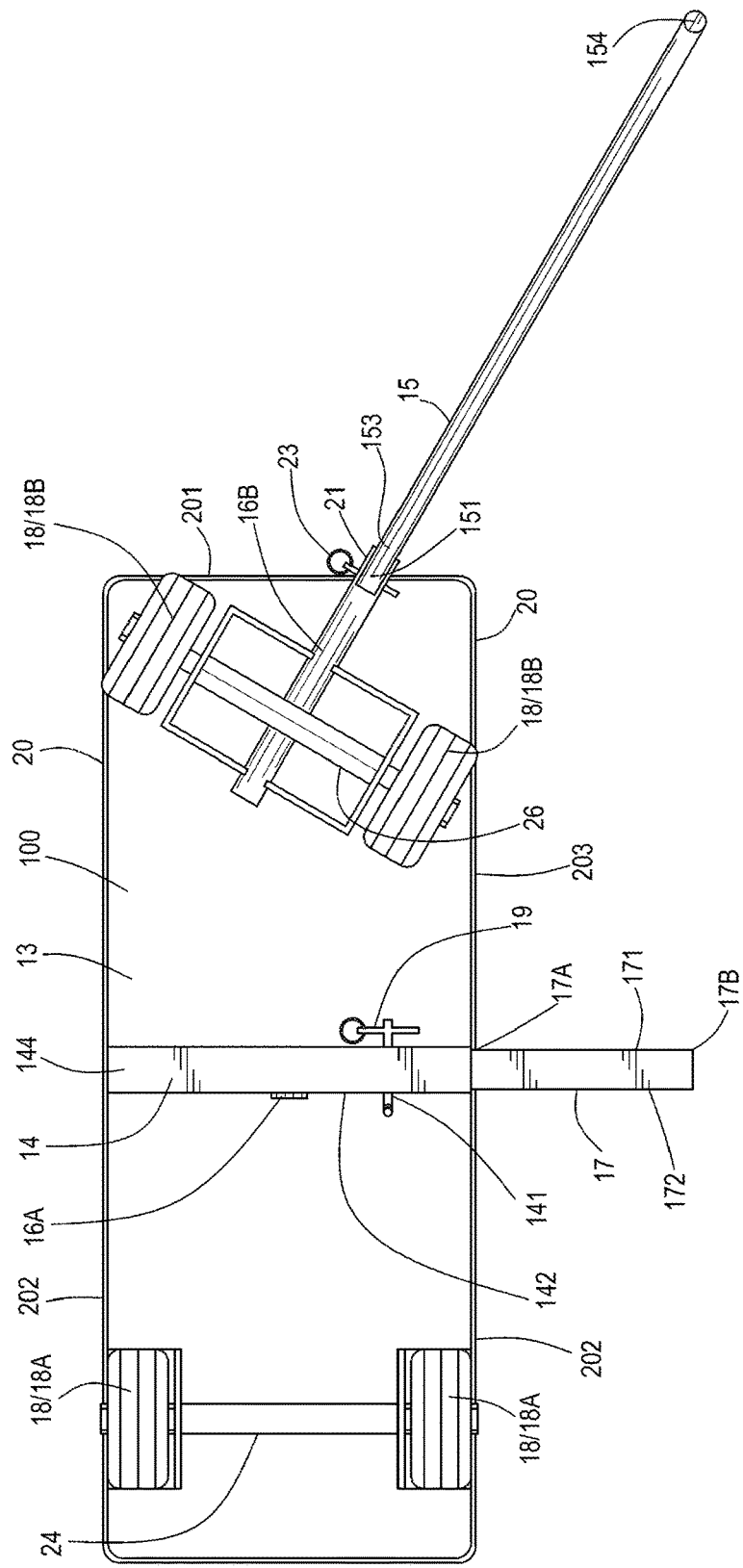
FIG. 8 is a bottom view of the exemplary trailer hitch attachable cooler of FIG. 1 showing (i) the rotatable cooler handle in a use position, and (ii) an extendable tubular member sized to fit within a trailer hitch receiver.
Figure 9:
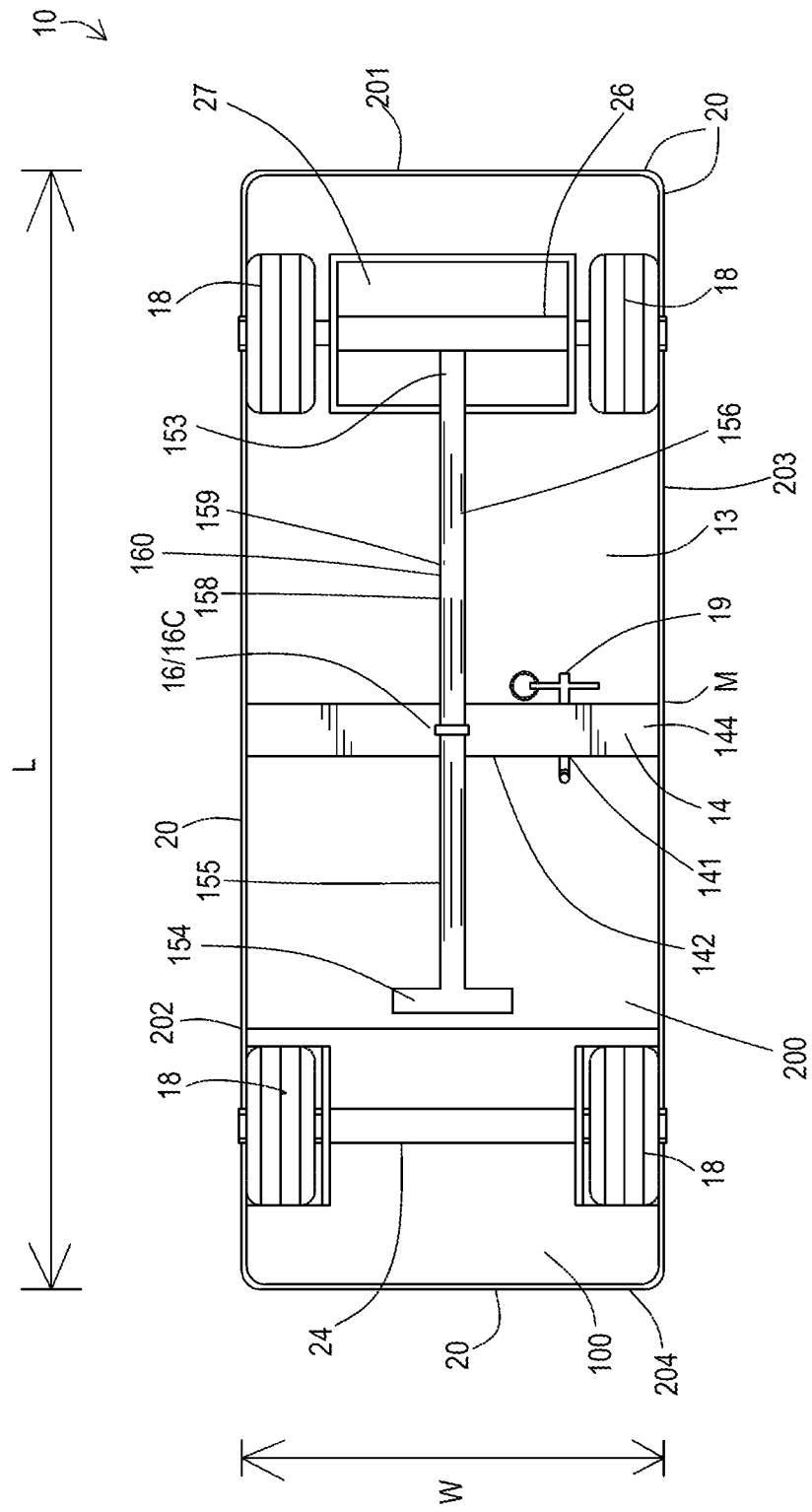
FIG. 9 is a bottom view of an alternative cooler handle and cooler handle system suitable for use with the exemplary trailer hitch attachable cart of FIG. 1 showing the cart handle in a storage position.
Figure 11:
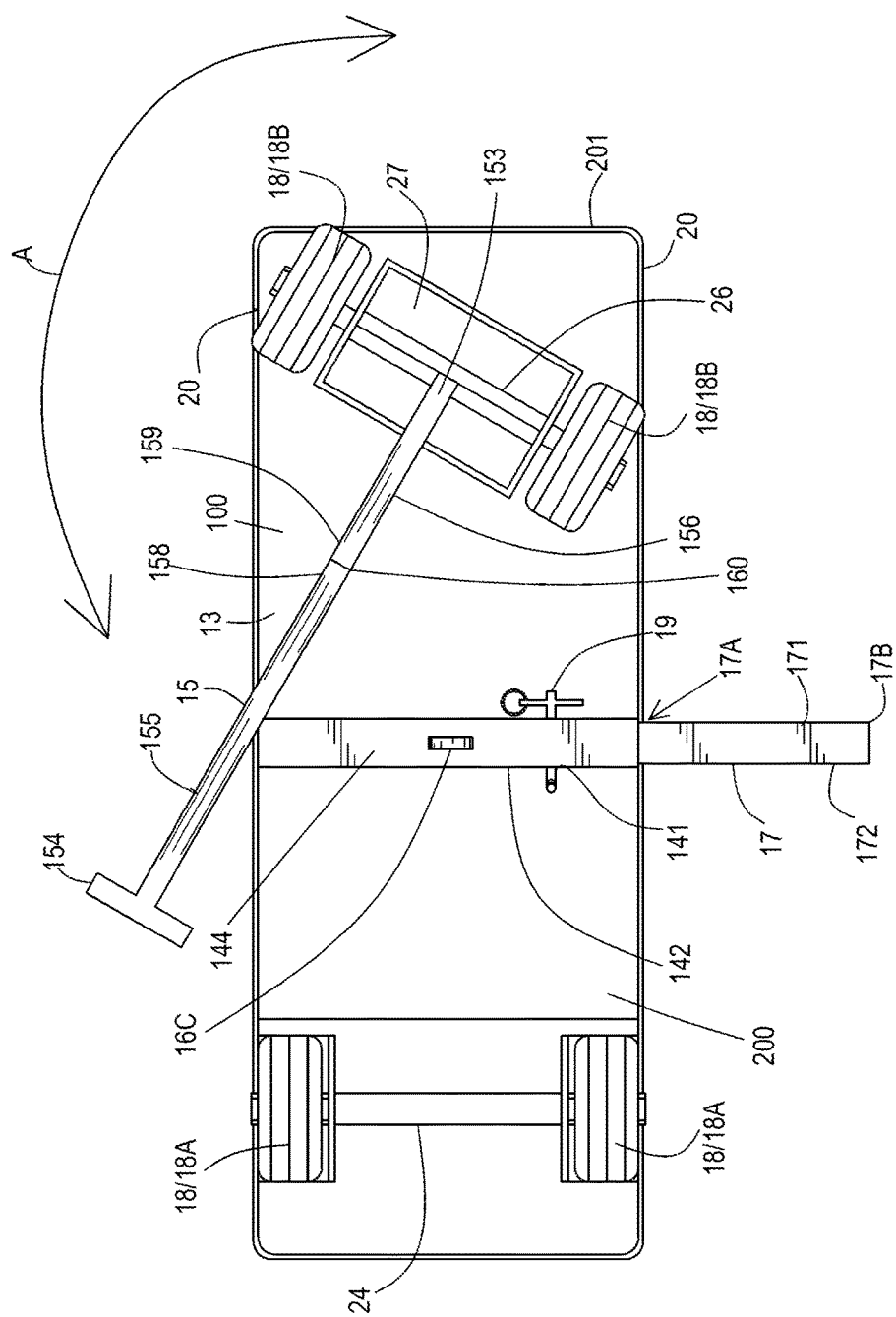
FIG. 11 is a bottom view of the exemplary trailer hitch attachable cart of FIG. 9 showing (i) the rotatable cart handle in a use position, and (ii) an extendable tubular member sized to fit within a trailer hitch receiver.
Figure 12:
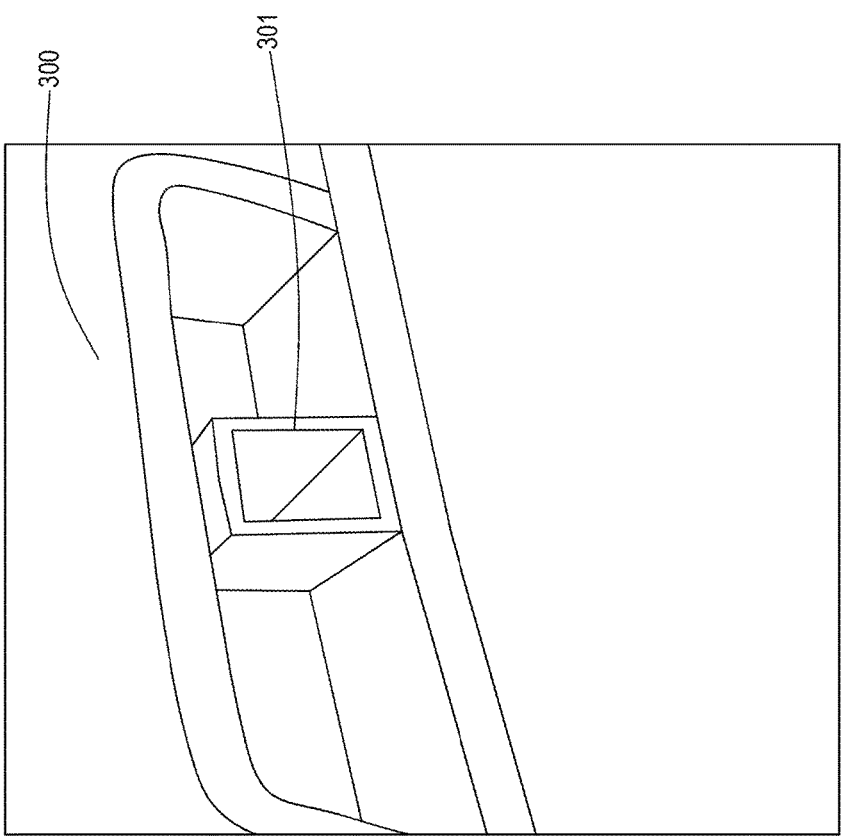
FIG. 12 is a perspective view of a portion of an exemplary vehicle showing an exemplary trailer hitch receiving member of the vehicle.

9. The trailer hitch attachable cooler 10 of embodiment 7 or 8, wherein said second tubular member 17 moves from (i) a second tubular member storage position in which a majority of said second tubular member 17 is positioned within said first tubular member 14 to (ii) a second tubular member use position in which said second tubular member 17 extends out of said first tubular member 14 beyond an outer edge 20 of said cooler 10. See, for example, second tubular member storage position shown in FIGS. 1-2 and 9, and second tubular member use position shown in FIGS. 8 and 11. Typically, both the first tubular member 14 and the second tubular member 17 are within an outer perimeter of cooler 10 when in the second tubular member storage position. In other words, during storage, when cooler 10 is viewed from an upper/top view, one cannot see the first tubular member 14 or the second tubular member 17.

10. The trailer hitch attachable cooler 10 of any one of embodiments 7 to 9, wherein said second tubular member 17 moves from (i) a second tubular member storage position in which all of said second tubular member 17 is positioned within said first tubular member 14 to (ii) a second tubular member use position in which said second tubular member 17 extends out of said first tubular member 14 beyond an outer edge 20 of said cooler 10. Typically, second tubular member 17 moves in a linear direction (e.g., in a linear direction parallel with cooler width W) from second tubular member storage position to second tubular member use position and vice versa.

11. The trailer hitch attachable cooler 10 of any one of embodiments 4 to 10, wherein said two or more wheels 18 comprise at least one wheel 18 that swivels relative to said lower cooler surface 13.

12. The trailer hitch attachable cooler 10 of any one of embodiments 4 to 11, wherein said two or more wheels 18 comprise four wheels 18.

13. The trailer hitch attachable cooler 10 of any one of embodiments 4 to 12, wherein said two or more wheels 18 comprise two front wheels 18 and two rear wheels, and said two front wheels 18 swivel relative to said lower cooler surface 13.

14. The trailer hitch attachable cooler 10 of any one of embodiments 1 to 13, further comprising a cooler handle 15.

15. The trailer hitch attachable cooler 10 of any one of embodiments 1 to 14, further comprising a cooler handle 15, said cooler handle 15 being attached to said cooler 10 proximate a lower cooler surface 13.

16. The trailer hitch attachable cooler 10 of any one of embodiments 1 to 14, further comprising a cooler handle 15, said cooler handle 15 (i) being attached to said cooler 10 proximate a lower cooler surface 13, and (ii) being rotatably movable so as to swivel one or more wheels 18 positioned along a front portion of said lower cooler surface 13.

17. The trailer hitch attachable cooler 10 of any one of embodiments 14 to 16, further comprising a storage system 16 for storing said cooler handle 15 when in a storage position, said storage system 16 comprising one or more cooler handle seating members 16 attached to said lower cooler surface 13, each of said one or more cooler handle seating members 16 being sized to accept and support a portion of said cooler handle 15 therethrough. FIGS. 1-7 and 9-10 show cooler handle 15 in a storage position.

18. The trailer hitch attachable cooler 10 of any one of embodiments 1 to 17, wherein said first tubular member 14 is attached directly to a lower cooler surface 13.

19. The trailer hitch attachable cooler 10 of any one of embodiments 1 to 18, wherein said cooler length L is approximately equal to a width of a vehicle 300, said vehicle 300 comprising a car, a truck, an all-terrain vehicle, or a bus.

20. The trailer hitch attachable cooler 10 of any one of embodiments 1 to 19, wherein said first tubular member 14 is positioned at an approximate midpoint M of said cooler length L. See, for example, FIG. 2.

21. The trailer hitch attachable cooler 10 of any one of embodiments 1 to 20, wherein said first tubular member 14 comprising two or more first holes 141 extending through a side wall 142 thereof, each of said first holes 141 being sized and shaped so as to receive a first pin member 19 therethrough.

22. The trailer hitch attachable cooler 10 of any one of embodiments 7 to 21, wherein said second tubular member 17 comprising two or more second holes 171 extending through a side wall 172 thereof, each of said second holes 171 being sized and shaped so as to receive a first pin member 19 therethrough.

23. The trailer hitch attachable cooler 10 of embodiment 22, further comprising a first pin member 19, said first pin member 19 being sized to extend within (i) any one of said two or more first holes 141, and (ii) any one of said two or more second holes 171, said first pin member 19 being insertable within (l) a first pair of a first hole 141 and a second hole 171 so as to lock said second tubular member 17 in said storage position within said first tubular member 14 (see, FIG. 2), and (ii) a second pair of a first hole 141 and a second hole 171 so as to lock said second tubular member 17 in use position wherein a portion of second tubular member 17 extends from and out of said first tubular member 14 (see, FIG. 8).

24. The trailer hitch attachable cooler 10 of any one of embodiments 17 to 23, wherein said one or more cooler handle seating members 16 comprise at least two loop members 16 comprise: (i) a ring-like loop member 16A attached to and extending downward from said first tubular member 14, and (ii) a tubular loop member 16B positioned between said ring-like loop member 16A and an outer edge 20 of said lower cooler surface 13. See, for example, FIGS. 2, 4-5 and 6B.

25. The trailer hitch attachable cooler 10 of embodiment 24, wherein said ring-like loop member 16A has a width of less than about 1.0 inch (in.) (or any value less than 1.0 in., in increments of 0.1 in., e.g., 0.4 in., or any range of values less than 1.0 in., in increments of 0.1 in., e.g., 0.3 in. to 0.8 in.), and said tubular loop member 16B has a tubular loop member length $L_{tm}$ of from about 1.0 in. to about 24.0 in. (or any value between 1.0 in. and 24.0 in., in increments of 0.1 in., e.g., 3.5 in., or any range of values between 1.0 in. and 24.0 in., in increments of 0.1 in., e.g., 1.2 in. to 5.8 in.). See, FIG. 2.

26. The trailer hitch attachable cooler 10 of embodiment 24 or 25, wherein said ring-like loop member 16A has a width of from about 0.2 in. to about 0.6 in., and said tubular loop member 16B has a tubular loop member length $L_{tm}$ of from about 3.0 in. to about 12.0 in.

27. The trailer hitch attachable cooler 10 of any one of embodiments 24 to 26, wherein a handle engaging end 21 of said tubular loop member 16B extends beyond an outer edge 20 of said lower cooler surface 13.

28. The trailer hitch attachable cooler 10 of any one of embodiments 24 to 27, wherein said tubular loop member 16B comprising one or more third holes 161 extending through a side wall 162 thereof. See, for example, FIG. 5.

29. The trailer hitch attachable cooler 10 of embodiment 28, wherein at least one of said one or more third holes 161 is within said handle engaging end 21 of said tubular loop member 16B.

30. The trailer hitch attachable cooler 10 of any one of embodiments 17 to 23, wherein said one or more cooler handle seating members 16 comprises at least one clip member 16C, said at least one clip member 16C enabling one-step positioning of said rotatable cooler handle 15 within said clip member 16C.

31. The trailer hitch attachable cooler 10 of embodiment 30, wherein said at least one clip member 16C comprises a single clip member 16C.

32. The trailer hitch attachable cooler 10 of embodiment 30 or 31, wherein said at least one clip member 16C is positioned along an outer surface 142/144 of said first tubular member 14.

33. The trailer hitch attachable cooler 10 of any one of embodiments 30 to 32, wherein said at least one clip member 16C is positioned along an outer lower surface 144 of said first tubular member 14.

34. The trailer hitch attachable cooler 10 of any one of embodiments 30 to 33, wherein each of said at least one clip member 16C comprises two clip member appendages 161 and 162, opposite ends 163 and 164 of said two clip member appendages 161 and 162, and a gap 165 between said opposite ends 163 and 164, said opposite ends 163 and 164 having a resiliency that enables a user to push said portion of said rotatable cooler handle 15 therebetween via an applied force. See, for example, FIG. 10.

35. The trailer hitch attachable cooler 10 of any one of embodiments 14 to 34, wherein said cooler handle 15 has at least one handle hole 151 therein or therethrough. See, for example, FIG. 5.

36. The trailer hitch attachable cooler 10 of embodiment 35, wherein said cooler handle 15 is detachable from said trailer hitch attachable cooler 10.

37. The trailer hitch attachable cooler 10 of embodiment 35 or 36, wherein said at least one handle hole 151 comprises (i) a first handle hole 151A within a cooler engaging end 153 of said rotatable cooler handle 15, and (ii) a second handle hole 151B proximate a grasping end 154 of said rotatable cooler handle 15, said first handle hole 151A being engaged when said cooler handle 15 is in a use position, and said second handle hole 151B being engaged when said cooler handle 15 is in a storage position.

38. The trailer hitch attachable cooler 10 of any one of embodiments 14 to 37, further comprising a second pin member 23, said second pin member 23 being sized and shaped so as to engage with said cooler handle 15 and said cooler 10 so as to attach said cooler handle 15 to said cooler 10 in a use position. See, for example, FIG. 8.

39. The trailer hitch attachable cooler 10 of embodiment 38, wherein said second pin member 23 engages with (i) said cooler handle 15 and (ii) said handle engaging end 21 of said tubular loop member 16B. See, for example, FIG. 8.

40. The trailer hitch attachable cooler 10 of embodiment 35, wherein said cooler handle 15 is permanently attached to said trailer hitch attachable cooler 10. As used herein, the phrase "permanently attached" describes a handle 15 that is attached to said lower cooler surface 13 of said cooler 10, and is not meant to be removed unless replaced due to wear.

41. The trailer hitch attachable cooler 10 of embodiment 35 or 40, wherein said cooler handle 15 comprises a handle grasping end 154 and a cooler engaging end 153 opposite said handle grasping end 154.

42. The trailer hitch attachable cooler 10 of embodiment 41, wherein said handle grasping end 154 is positioned beneath said lower cooler surface 13 of said cooler 10 and said first tubular member 14 when in said storage position.

43. The trailer hitch attachable cooler 10 of embodiment 41 or 42, wherein said handle grasping end 154 rotates from (i) said storage position beneath said lower cooler surface 13 of said cooler 10 and said first tubular member 14 to (ii) a use position, wherein said handle grasping end 154 is positioned outside an outer edge 20 of said cooler 10. See, for example, rotation direction A shown in FIG. 11. In desired embodiments, cooler handle 15 rotates within a plane from one side of clip member 16C to the other, or a rotation range of up to about 350° (or any value less than about 350°, in increments of 0.1°, e.g., 345.2°, or any range of values less than about 350°, in increments of 0.1°, e.g., 180° to 270°.

44. The trailer hitch attachable cooler 10 of any one of embodiments 41 to 43, wherein said cooler connecting end 153 of said cooler handle 15 is connected to said cooler 10 proximate an outer front edge 201 of said cooler 10.

45. The trailer hitch attachable cooler 10 of any one of embodiments 41 to 44, wherein said cooler connecting end 153 of said cooler handle 15 is connected to said cooler 10 along an outer front edge 201 of said cooler 10.

46. The trailer hitch attachable cooler 10 of any one of embodiments 41 to 45, wherein said cooler connecting end 153 of said cooler handle 15 is connected to said cooler 10 via a handle pivoting member 27.

47. The trailer hitch attachable cooler 10 of any one of embodiments 41 to 46, wherein said cooler connecting end 153 of said cooler handle 15 is connected to said cooler 10 via a handle pivoting member 27, said handle pivoting member 27 being pivotably mounted to said lower cooler surface 13 so as to pivot along with one or more front wheels 18 of said cooler 10.

Figure 10:
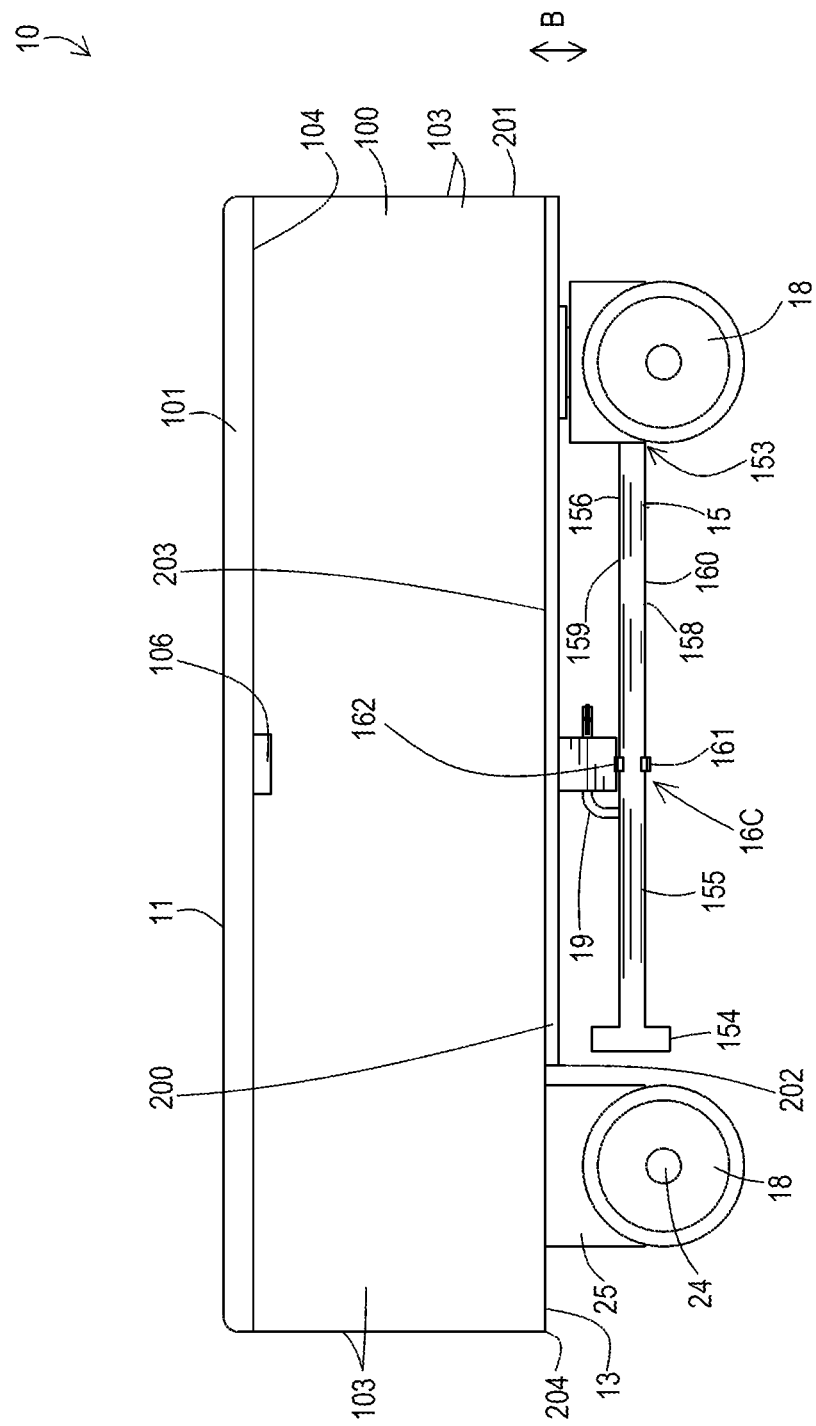
FIG. 10 is a side view of the exemplary trailer hitch attachable cart of FIG. 9.

48. The trailer hitch attachable cooler 10 of any one of embodiments 14 to 47, wherein said cooler handle 15 comprises two handle components 155/156 joined to one another via a handle joint 157, said two handle components 155/156 comprising (i) a first handle component 155 comprising a handle grasping end 154 and a first handle component joining end 158, and (ii) a second handle component 156 comprising a cooler connecting end 153 and a second handle component joining end 159, said second handle component joining end 159 being joined to said first handle component joining end 158. In some embodiments, a joint 160 is positioned between and joins first handle component joining end 158 to second handle component joining end 159. See, for example, FIG. 11. In some embodiments, joint 160 enables first handle component 155 to move up and down relative to second handle component 156 along a path B as shown in FIG. 10.

49. The trailer hitch attachable cooler 10 of any one of embodiments 4 to 48, wherein said two or more wheels 18 comprises four wheels 18. As discussed above, in one desired embodiment, each wheel 18 has a substantially identical size and shape, and has an overall diameter of about 8.5 in. and a wheel width of about 5.0 in.

50. The trailer hitch attachable cooler 10 of any one of embodiments 4 to 49, wherein said two or more wheels 18 comprises: a set of two rear wheels 18A, and at least one front wheel 18B, said at least one front wheel 18B being pivotably connected to said lower cooler surface 13 of said cooler 10. See, for example, FIG. 8.

51. The trailer hitch attachable cooler 10 of embodiment 50, wherein said cooler 10 further comprises a rear wheel axle 24 connecting said two rear wheels 18A to one another.

52. The trailer hitch attachable cooler 10 of embodiment 50 or 51, wherein said cooler 10 further comprises a rear wheel connecting member 25, said rear wheel connecting member 25 connecting said two rear wheels 18A to said lower cooler surface 13 of said cooler 10.

53. The trailer hitch attachable cooler 10 of any one of embodiments 50 to 52, wherein said cooler 10 further comprises a front wheel axle 26 connecting two front wheels 18B to one another.

54. The trailer hitch attachable cooler 10 of any one of embodiments 50 to 53, wherein said cooler 10 further comprises a pivoting member 27 attached to said lower cooler surface 13 of said cooler 10, said pivoting member 27 (i) connecting said at least one front wheel 18B to said lower cooler surface 13 of said cooler 10, and (ii) enabling said at least one front wheel 18B to pivot relative to said cooler 10.

55. The trailer hitch attachable cooler 10 of embodiment 54, wherein said second pin member 19 engages with (i) said cooler handle 15 and (ii) said handle engaging end 21 of said tubular loop member 16B, said tubular loop member 16B being attached to said pivoting member 27.

56. The trailer hitch attachable cooler 10 of any one of embodiments 2 to 55, wherein said one or more cooler side walls 103 comprises four cooler side walls 103.

57. The trailer hitch attachable cooler 10 of any one of embodiments 2 to 56, wherein said cooler length L is greater than said cooler width W resulting in an overall rectangular shape for said cooler 10.

58. The trailer hitch attachable cooler 10 of any one of embodiments 2 to 57, wherein said cooler lid 101 is attached to said cooler body 100 proximate said cooler body upper edge 104.

59. The trailer hitch attachable cooler 10 of any one of embodiments 2 to 58, wherein said cooler lid 101 is attached to said cooler body 100 proximate said cooler body upper edge 104 via two or more lid hinges 105.

Figure 3A:
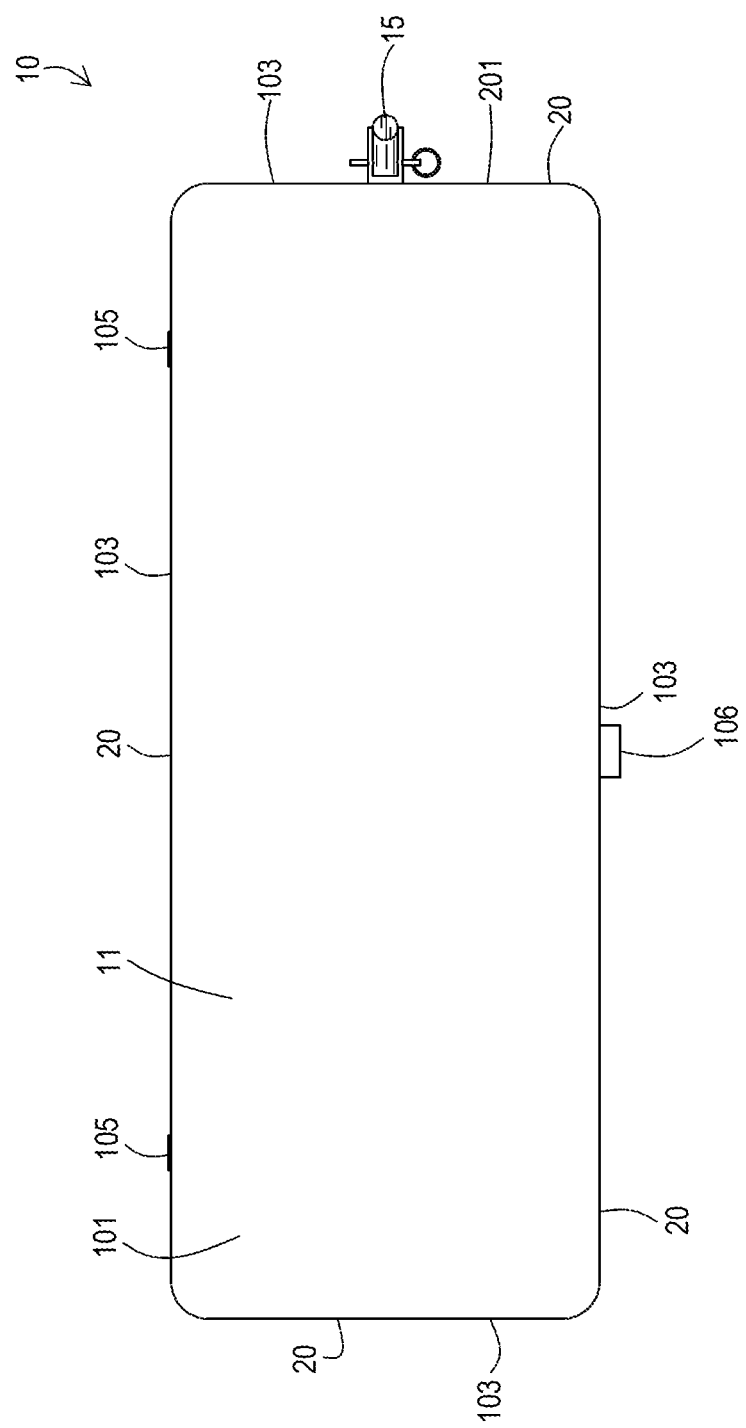
FIG. 3A is a top view of the exemplary trailer hitch attachable cooler of FIG. 1 with the cooler lid in a closed position.
Figure 3B:
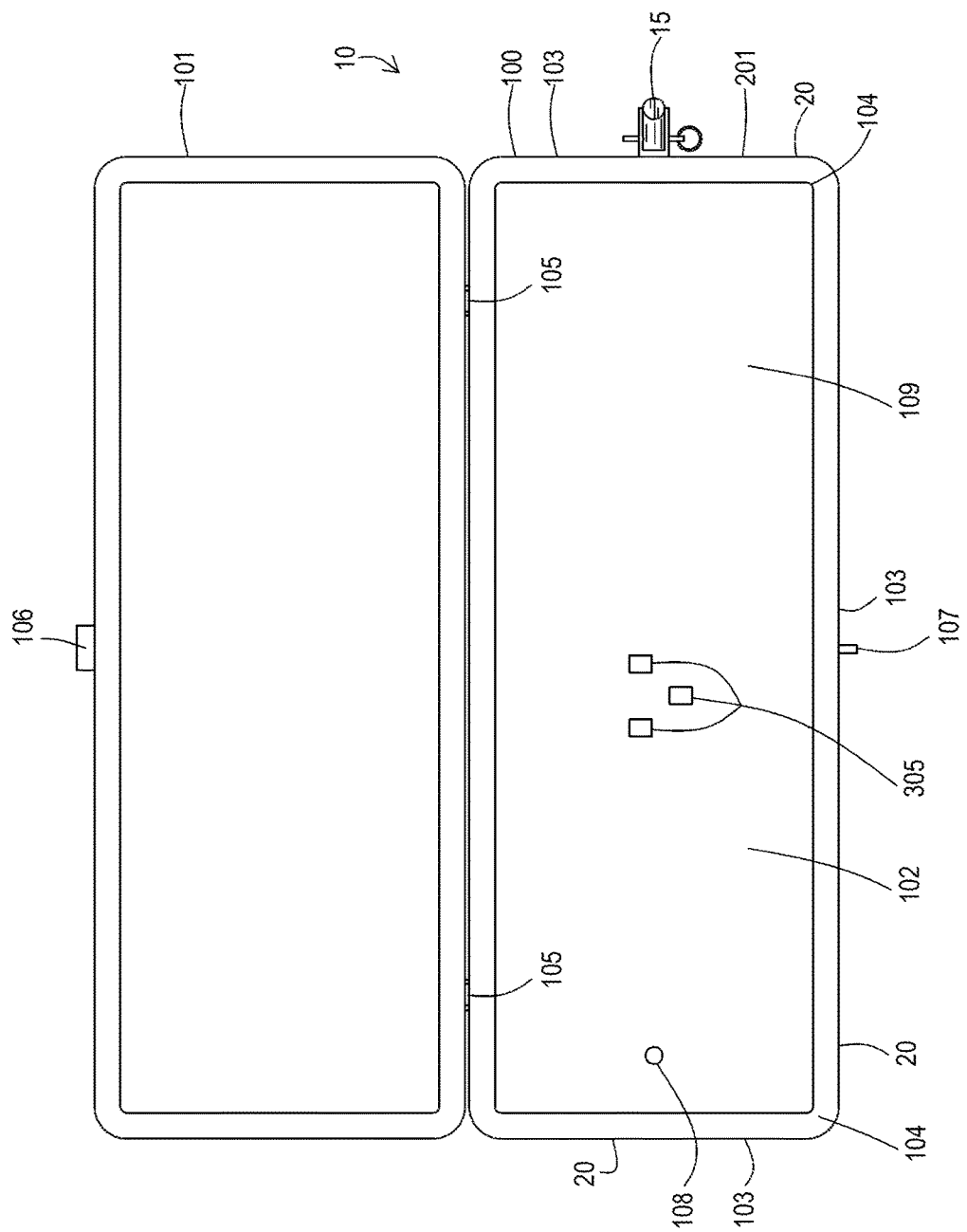
FIG. 3B is a top view of the exemplary trailer hitch attachable cooler of FIG. 1 with the cooler lid in an open position.
Figure 4:
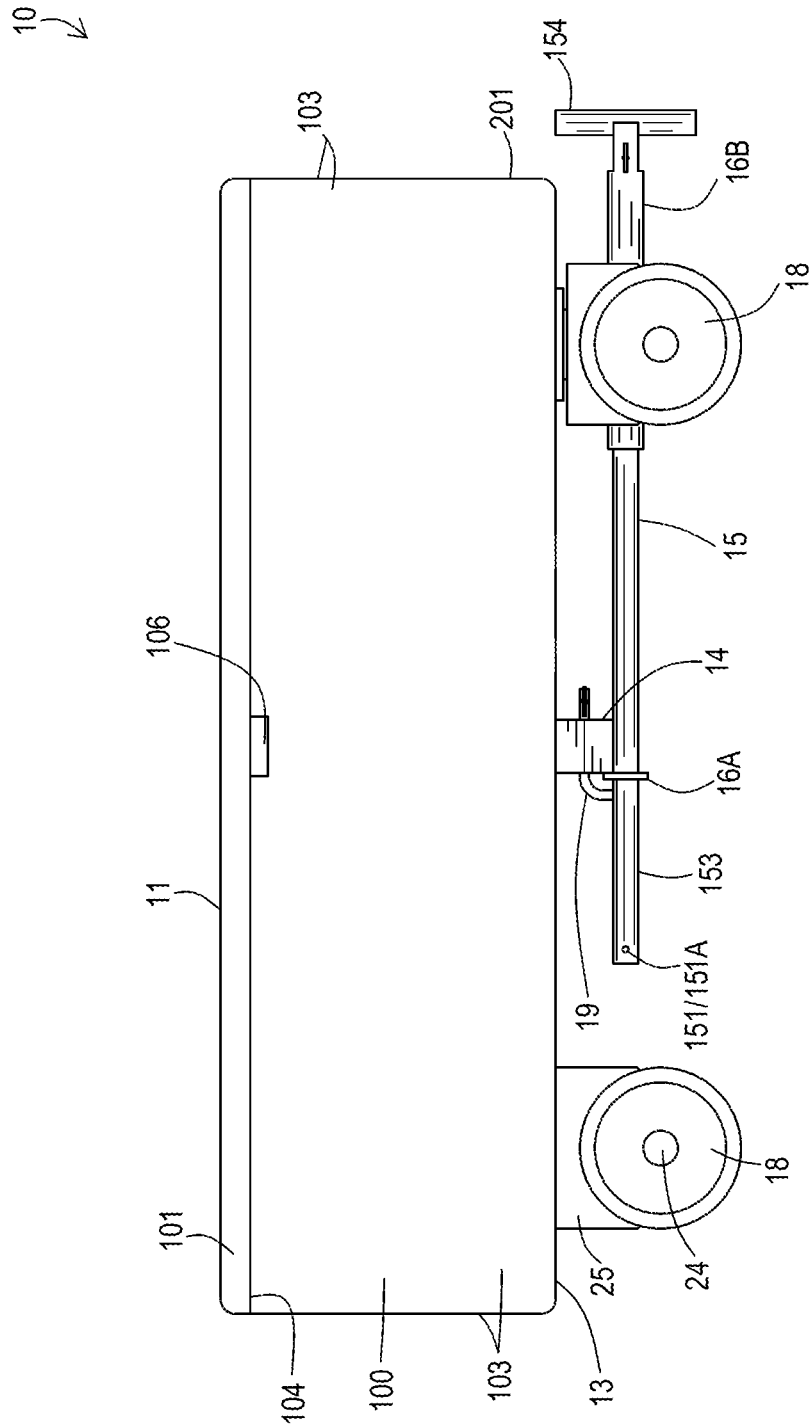
FIG. 4 is a frontal view of the exemplary trailer hitch attachable cooler of FIG. 1.
Figure 6B:
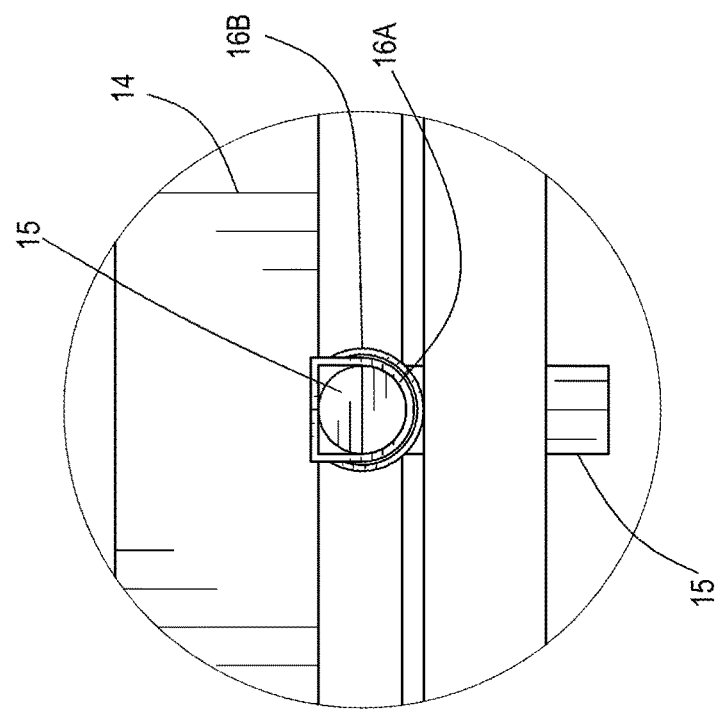
FIG. 6B is an exploded view of the area labeled "6B" in FIG. 6A.
Figure 6A:
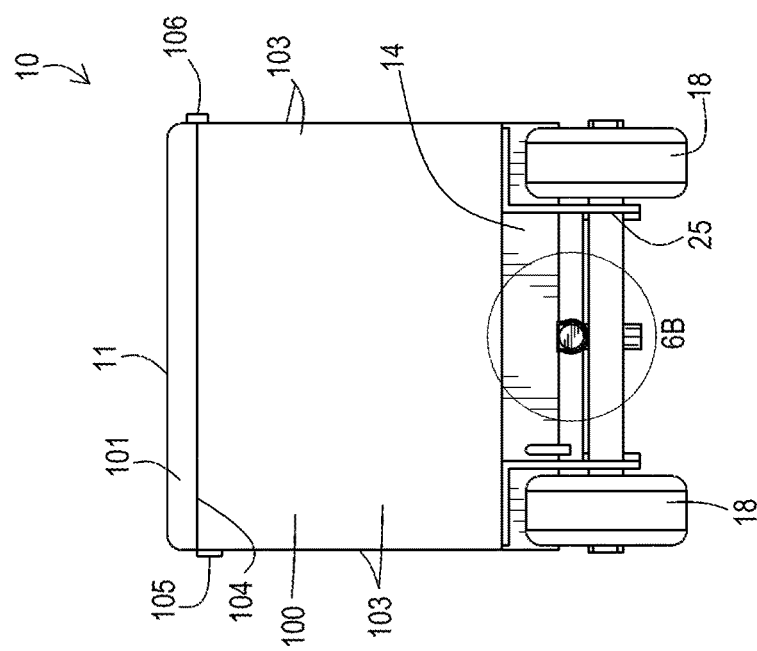
FIG. 6A is a side view of the exemplary trailer hitch attachable cooler of FIG. 1 as viewed from the right-hand side of the exemplary trailer hitch attachable cooler as shown in FIG. 5.
Figure 7:
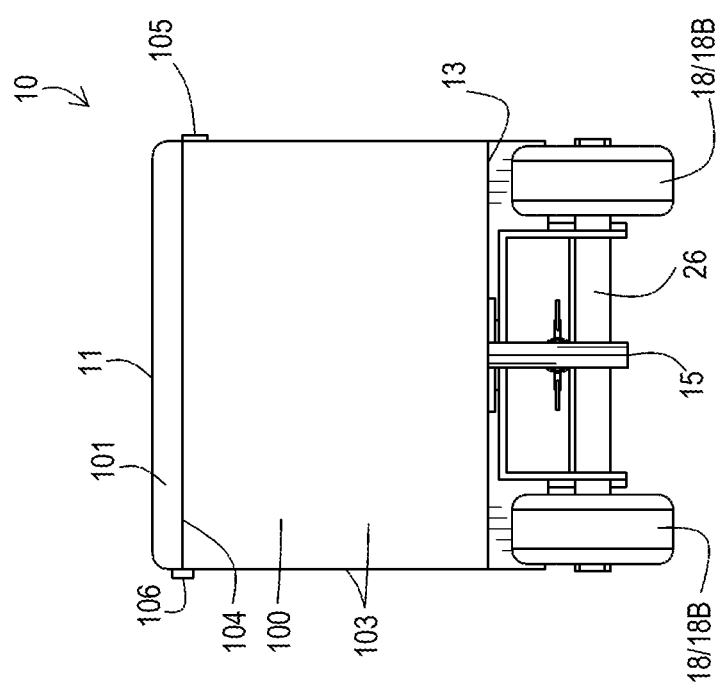
FIG. 7 is a side view of the exemplary trailer hitch attachable cooler of FIG. 1 as viewed from the left-hand side of the trailer hitch attachable cooler as shown in FIG. 5.

60. The trailer hitch attachable cooler 10 of any one of embodiments 2 to 59, wherein said cooler lid 101 further comprises a lid fastening member 106, said cooler body 100 further comprises a cooler body fastening member 107 proximate said cooler body upper edge 104, and said lid fastening member 106 is engageable with said cooler body fastening member 107 so as to temporarily lock said cooler lid 101 onto said cooler body 100. See, for example, FIG. 3B. Also shown in FIG. 3B is a drain 108 within a lower inner wall 109 of cooler body 100. A plug (not shown) may be used to plug drain 108 within cooler body 100 or along an outer surface (e.g., lower cooler surface 13) of cooler body 100.

61. The trailer hitch attachable cooler 10 of any one of embodiments 2 to 60, wherein said cooler volume 102 ranges from about 2.0 cubic feet ($ft^3$) to about 75.0 $ft^3$ (or any volume value therebetween).

62. The trailer hitch attachable cooler 10 of any one of embodiments 1 to 61, wherein said cooler 10 further comprises one or more surface holes therein (not shown), said one or more surface holes being sized to house one or more removable objects therein (not shown). For example, one or more surface holes may be present along a front side wall 103 surface so as to temporarily house a flashlight (not shown). The one or more surface holes may be formed via, for example, a molding step, when cooler body 100 is formed.

63. The trailer hitch attachable cooler 10 of embodiment 62, further comprises one or more removable objects positioned within said one or more surface holes.

64. The trailer hitch attachable cooler 10 of embodiment 62 or 63, wherein said one or more removable objects comprise a flashlight.

65. The trailer hitch attachable cooler 10 of any one of embodiments 1 to 64, wherein said cooler 10 further comprises one or more cup holders (not shown). For example, one or more cup holders may be present within upper cooler surface 11. The one or more cup holders may be formed via, for example, a molding step, when cooler lid 101 is formed.

66. The trailer hitch attachable cooler 10 of any one of embodiments 1 to 65, wherein said cooler 10 further comprises one or more fishing rod holders (not shown). For example, one or more fishing rod holders may be present within upper cooler surface 11 and/or along one or more side walls 103. The one or more cup holders may be formed via, for example, a molding step, when cooler body 100 is formed.

67. The trailer hitch attachable cooler 10 of any one of embodiments 14 to 66, wherein said cooler handle 15 comprises a telescoping cart handle 15.

68. The trailer hitch attachable cooler 10 of any one of embodiments 14 to 67, wherein said cooler handle 15 is attach to said cooler 10 in a use position. See, for example, FIGS. 8 and 11.

69. The trailer hitch attachable cooler 10 of any one of embodiments 14 to 67, wherein said cooler handle 15 is attach to said cooler 10 in a storage position. See, for example, FIGS. 1-7 and 9-10.

70. The trailer hitch attachable cooler 10 of any one of embodiments 2 to 69, wherein said cooler body 100, said cooler lid 101, and said first tubular member 14 (or any other cooler 10 component) each independently comprises a metal material, a polymeric material, a composite material, a cellulosic material, or any combination thereof.

71. The trailer hitch attachable cooler 10 of any one of embodiments 2 to 70, wherein said cooler body 100 and said cooler lid 101 each independently comprise a polymeric material, and said first tubular member 14 comprises a metal material.

72. The trailer hitch attachable cooler 10 of embodiment 70 or 71, wherein said metal material is selected from aluminum, steel, or a combination thereof.

73. The trailer hitch attachable cooler 10 of any one of embodiments 1 to 72, wherein said first tubular member 14 is at least partially coated with an anti-slip material (not shown).

74. The trailer hitch attachable cooler 10 of embodiment 73, wherein said anti-slip material comprises a rubber-like material.

75. The trailer hitch attachable cooler 10 of any one of embodiments 2 to 74, further comprising a stabilizing plate 201 positioned along said cooler lower surface 13 and between said cooler lower surface 13 and said first tubular member 14. See, for example, stabilizing plate 201 shown in FIGS. 9-11.

76. The trailer hitch attachable cooler 10 of embodiment 75, wherein said stabilizing plate 201 extends along said cooler lower surface 13, in a width direction, a distance substantially equal to cooler width W.

77. The trailer hitch attachable cooler 10 of embodiment 75 or 76, wherein said stabilizing plate 201 extends along said cooler lower surface 13, in a length direction, a distance substantially equal to or greater than a distance between point 202 and point 203 shown in FIG. 9.

78. The trailer hitch attachable cooler 10 of any one of embodiments 75 to 77, wherein said stabilizing plate 201 extends along said cooler lower surface 13, in a length direction, a distance substantially equal to a distance between point 202 and front edge 201 shown in FIG. 9.

79. The trailer hitch attachable cooler 10 of any one of embodiments 75 to 78, wherein said stabilizing plate 201 extends along said cooler lower surface 13, in a length direction, a distance substantially equal to cooler length L.

80. The trailer hitch attachable cooler 10 of any one of embodiments 75 to 79, wherein said stabilizing plate 201 comprises a metal plate.

81. The trailer hitch attachable cooler 10 of any one of embodiments 2 to 80, wherein said cooler body 100 is designed to provide insulating properties to one or more objects 305 (e.g., food items, medicine, etc.) positioned within a cooler volume 102 bound by said cooler body 100. Desirably, cooler body 100 is designed to maintain ice in a frozen state for up to 7 days after placing the ice within cooler volume 102 bound by said cooler body 100.

82. The trailer hitch attachable cooler 10 of any one of embodiments 1 to 81 in combination with a trailer hitch receiving member 301 of the vehicle 300.

83. The trailer hitch attachable cooler 10 of any one of embodiments 1 to 82 attached to a trailer hitch receiving member 301 of the vehicle 300.

Methods of Making Trailer Hitch Attachable Coolers Embodiments

84. A method of making the trailer hitch attachable cooler 10 of any one of embodiments 1 to 83, said method comprising: attaching one or more components to one another so as to form the trailer hitch attachable cooler 10.

85. The method of embodiment 84, further comprising: forming one or more components used to make the trailer hitch attachable cooler 10.

86. The method of embodiment 85, wherein said forming step comprises at least one of: extruding material to form at least one of the first tubular member 14, the cooler handle 15, the one or more cooler handle seating members 16 for supporting the cooler handle 15 beneath the lower cooler surface 13, the second tubular member 17, and the stabilizing plate 201; cutting material to form at least one of the first tubular member 14, the cooler handle 15, the one or more cooler handle seating members 16 for supporting the cooler handle 15 beneath the lower cooler surface 13, the second tubular member 17, and the stabilizing plate 201; machining material to form at least one of the first tubular member 14, the cooler handle 15, the one or more cooler handle seating members 16 for supporting the cooler handle 15 beneath the lower cooler surface 13, and the second tubular member 17; drilling one or more holes in at least one of the first tubular member 14, the cooler handle 15, the one or more cooler handle seating members 16 for supporting the cooler handle 15 beneath the lower cooler surface 13, and the second tubular member 17; and molding material to form at least one of the cooler body 100, the cooler lid 101, the two or more lid hinges 105, the lid fastening member 106, and the cooler body fastening member 107.

Methods of Using Trailer Hitch Attachable Coolers Embodiments

87. A method of using the trailer hitch attachable cooler 10 of any one of embodiments 1 to 81, said method comprising: attaching the trailer hitch attachable cooler 10 to a trailer hitch receiving member 301 of a vehicle 300.

88. The method of embodiment 87, further comprising: storing one or more items (not shown) within the cooler volume 102 of the cooler 10.

89. The method of embodiment 87 or 88, further comprising: detaching the trailer hitch attachable cooler 10 from the trailer hitch receiving member 301 of the vehicle 300.

90. The method of any one of embodiments 87 to 89, further comprising: positioning the cooler handle 15 underneath the lower cooler surface 13 in a storage position via the one or more cooler handle seating members 16.

91. The method of any one of embodiments 87 to 90, further comprising: disconnecting the cooler handle 15 from the one or more cooler handle seating members 16; and positioning the cooler handle 15 in a use position. See, for example, FIGS. 8 and 11.

92. The method of any one of embodiments 87 to 91, further comprising: detaching the cooler handle 15 from the trailer hitch attachable cooler 10.

93. The method of any one of embodiments 87 to 92, further comprising: attaching the cooler handle 15 to the trailer hitch attachable cooler 10.

94. The method of any one of embodiments 87 to 93, further comprising: moving the trailer hitch attachable cooler 10 from one location to another location by applying a pulling force on the cooler handle 15.

95. The method of any one of embodiments 87 to 94, wherein the vehicle 300 comprises a car, a truck, an all-terrain vehicle, or a bus.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of Trailer Hitch Attachable Coolers

Exemplary trailer hitch attachable coolers as shown in FIGS. 1-11 were prepared.

It should be understood that although the above-described trailer hitch attachable coolers and/or methods are described as "comprising" one or more components or steps, the above-described trailer hitch attachable coolers and/or methods may "comprise," "consists of," or "consist essentially of" the above-described components, features or steps of the trailer hitch attachable coolers and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a trailer hitch attachable cooler and/or method that "comprises" a list of elements (e.g., components, features, or steps) is not necessarily limited to only those elements (or components or steps), but may include other elements (or components or steps) not expressly listed or inherent to the trailer hitch attachable cooler and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a trailer hitch attachable cooler and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described trailer hitch attachable coolers and/or methods may comprise, consist essentially of, or consist of any of the herein-described components, features and steps, as shown in the figures with or without any feature(s) not shown in the figures. In other words, in some embodiments, the trailer hitch attachable coolers and/or methods of the present invention do not have any additional features other than those shown in the figures, and such additional features, not shown in the figures, are specifically excluded from the trailer hitch attachable coolers and/or methods. In other embodiments, the trailer hitch attachable coolers and/or methods of the present invention do have one or more additional features that are not shown in the figures. For example, although not shown in the figures, the trailer hitch attachable coolers of the present invention may further comprise one or more of the following additional features: a bottle opener positioned along an outer surface (e.g., along a surface of the fishing rod holder, along a surface of the platform such as a rear surface, etc.) of the cooler; a knife and/or pliers holder cut into the fishing rod holder accessory; grab handles molded into the cooler.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A trailer hitch attachable insulated cooler, said insulated cooler comprising:
    a cooler body comprising a cooler lid, a lower inner wall, one or more cooler side walls extending between said lower inner wall and a cooler body upper edge, a cooler volume bound by said cooler lid, said lower inner wall, and said one or more cooler side walls, a cooler upper surface, a cooler lower surface opposite said cooler upper surface, a cooler length L, and a cooler width W, said cooler body being able to provide insulating properties to one or more objects positioned within said cooler volume bound by said cooler lid, said lower inner wall, and said one or more cooler side walls;
    a first tubular member comprising a first square tube having four interconnected tube side walls and a hollow channel extending through and being surrounded by said four interconnected tube side walls of said first square tube, said first tubular member (i) being integrally attached to said cooler body and (ii) having a first size and a first cross-sectional shape so as to enable attachment of said insulated cooler to a trailer hitch receiving member, said first tubular member (i) is integrally attached to the cooler lower surface or embedded within one or more cooler side walls (ii) extends along the cooler width W, and (iii) extends a distance of at least 0.5 times the cooler width W;
    a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within a trailer hitch receiving member of a vehicle, wherein said second tubular member moves from (i) a second tubular member storage position in which a majority of said second tubular member is positioned within said first tubular member to (ii) a second tubular member use position in which said second tubular member extends out of said first tubular member beyond an outer edge of said insulated cooler;
    four wheels (i) permanently attached to the cooler lower surface of said insulated cooler and (ii) extending below said first tubular member;
    a cooler handle, said cooler handle being detachable from said trailer hitch attachable insulated cooler; and
    a storage system for storing said cooler handle when in a storage position, said storage system comprising one or more cooler handle seating members attached to said cooler lower surface, each of said one or more cooler handle seating members being sized to accept and support a portion of said cooler handle therethrough.

* * * * *